US009172284B2

(12) United States Patent
Truillet et al.

(10) Patent No.: US 9,172,284 B2
(45) Date of Patent: Oct. 27, 2015

(54) DEVICE FOR RECEIVING A PULSER MOTOR OF A VENTILATION INSTALLATION OF A VEHICLE (75) Inventors: Franck Truillet, Bu (FR); Eric Droulez, Suresnes (FR); Ronan Cozic, Luce (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 393 days.

(21) Appl. No.: 13/806,186

(22) PCT Filed: Jun. 14, 2011

(86) PCT No.: PCT/EP2011/059862
§ 371 (c)(1),
(2), (4) Date: May 9, 2013

(87) PCT Pub. No.: WO2011/160983
PCT Pub. Date: Dec. 29, 2011

(65) Prior Publication Data
US 2013/0221786 A1 Aug. 29, 2013

(30) Foreign Application Priority Data
Jun. 24, 2010 (FR) .................................... 10 02651

(51) Int. Cl.
H02K 5/00 (2006.01)
H02K 5/26 (2006.01)
F04D 25/08 (2006.01)
F04D 29/62 (2006.01)
F04D 29/66 (2006.01)
H02K 5/24 (2006.01)

(52) U.S. Cl.
CPC ........ *H02K 5/26* (2013.01); *F04D 25/08* (2013.01); *F04D 29/626* (2013.01); *F04D 29/668* (2013.01); *H02K 5/24* (2013.01)

(58) Field of Classification Search
CPC .......... H02K 5/26; F04D 25/08; F04D 29/668
USPC ....................... 310/91, 51; 248/603, 605, 675
See application file for complete search history.

(56) References Cited

U.S. PATENT DOCUMENTS 5,530,304 A * 6/1996 Mirumachi et al. ............ 310/51
5,533,704 A    7/1996 Fischinger et al.
(Continued)

FOREIGN PATENT DOCUMENTS

EP          0642206 A1    3/1995

OTHER PUBLICATIONS

English language abstract for EP 0642206 extracted from espacenet.com database on May 14, 2013, 11 pages.
(Continued)

*Primary Examiner* — Hanh Nguyen
(74) *Attorney, Agent, or Firm* — Howard & Howard Attorneys PLLC (57) ABSTRACT The invention relates to a device for receiving an electric motor (1) which extends along a longitudinal axis (2) and can be housed inside a motor support of a ventilation installation for a vehicle, said receiving device being connected to said motor support by a decoupling means and comprising a collar (18) on which a first blocking means (30) is formed, and a ring (13) comprising a second blocking means (22), characterized in that the collar (18) and the ring (13) are separate and connected to each other by at least one fixing means (23).

21 Claims, 8 Drawing Sheets

(56) References Cited

U.S. PATENT DOCUMENTS

| | | | |
|---|---|---|---|
| 6,076,795 A * | 6/2000 | Scheidel et al. | 248/603 |
| 7,078,835 B2 * | 7/2006 | Gross et al. | 310/89 |
| 7,876,009 B2 * | 1/2011 | Baranowski et al. | 310/89 |
| 8,596,596 B2 * | 12/2013 | Naji et al. | 248/224.7 |
| 2003/0080635 A1 | 5/2003 | Bacile et al. | |
| 2009/0285672 A1 | 11/2009 | Park et al. | |

OTHER PUBLICATIONS

International Search Report for Application No. PCT/EP2011/059862 dated Feb. 13, 2012, 5 pages.

* cited by examiner

DEVICE FOR RECEIVING A PULSER MOTOR OF A VENTILATION INSTALLATION OF A VEHICLE

RELATED APPLICATIONS

This application is the National Stage of International Patent Application No. PCT/EP2011/059862, filed on Jun. 14, 2011, which claims priority to and all the advantages of French Patent Application No. FR 10/02651, filed on Jun. 24, 2010, the content of which is incorporated herein by reference.

FIELD OF THE INVENTION

The technical sector of the present invention is that of devices for supporting a motor for a ventilation, heating and/or air conditioning system for a motor vehicle. More particularly, the invention relates to a device for receiving a motor actuating a propellor rotor of the aforementioned installation.

DESCRIPTION OF THE RELATED ART

In a ventilation, heating and/or air conditioning system, the air stream flowing therein is propelled by a propellor rotor that is rotated by a motor. The dimensional characteristics of these components vary depending on the volume of the interior of the vehicles concerned. For example, the volume of the interior of a vehicle of the city type is markedly smaller than the volume of the interior of a vehicle of the family type such as for example a multi-purpose vehicle or an all-terrain vehicle. It is also the case for a ventilation, heating and/or air conditioning installation identical to one and the same vehicle platform, said platform having variants in various types of interior (one-box, hatchback, notchback).

The characteristics of the electric motor that operates the propellor rotor are therefore directly linked to this volume and to the flow rate of air that must be provided to renew this volume of air. It is therefore understood that a vehicle of the city type is satisfied with an electric motor of low power/small space requirement to actuate the propellor rotor while the vehicle of the family type requires the use of an electric motor of high power/considerable space requirement to operate the propellor rotor.

Moreover, the size of the electric motors may vary from one motor supplier to another even at constant power. These dimensional variations of the motors therefore involve a dimensional variation in the components that receive and retain these motors. In other words, the motor support of a low power/small space requirement motor is nowadays different, in particular smaller, than a motor support of a high power/considerable space requirement electric motor.

This situation involves a certain number of major drawbacks.

One of the main drawbacks is that it is necessary to design and develop a motor support for each type or size of electric motor while the rest of the installation is identical. More particularly, it is necessary to design and develop a motor support collar that is specific to each type or size of electric motor.

Another drawback of the prior art specified above lies in the fact that the multiplicity of motor supports generates a logistical complication in one and the same factory that manufactures ventilation, heating and/or air conditioning installations. This constraint relates to the parts as such but also to the different toolage that it is necessary to store and manage.

Finally, these drawbacks increase the costs of developing and of manufacturing the installations in question.

SUMMARY OF THE INVENTION

The object of the present invention is therefore to resolve the drawbacks described above mainly by standardizing certain parts constituting the motor-fan unit and more particularly the motor support and by shifting the specifics of the electric motors to a part constituting the motor-fan unit that is smaller and simple to manufacture. It is therefore easier to manage the logistical constraints concerning a single small part than concerning a set of components that are all adapted to the specifics of a particular motor.

The subject of the invention is therefore a device for receiving an electric motor which extends along a longitudinal axis and which is capable of being housed inside a motor support of a ventilation installation for a vehicle, said receiving device is connected to said motor support by a decoupling means and comprises a collar on which is formed a first immobilizing means, a ring comprising a second immobilizing means, characterized in that the collar and the ring are distinct and connected to one another by at least one fastening means.

According to a first feature of the invention, the first immobilizing means is capable of limiting the movement of the motor along the longitudinal axis and thus forms a bearing abutment against which the motor is held.

According to a second feature of the invention, the motor support comprises a collar capable of surrounding the motor and from which emerges the first immobilizing means, the first immobilizing means taking the form of an abutment which extends radially relative to the axis 2 relative to the collar.

According to another feature of the invention, the second immobilizing means is capable of limiting the movement of the motor along the longitudinal axis.

According to yet another feature of the invention, the ring comprises a body capable of surrounding the motor and from which emerges the second immobilizing means, the second immobilizing means taking the form of an abutment which extends at an angle relative to said body.

According to yet another feature of the invention, the first immobilizing means is capable of retaining said motor in a first direction along the longitudinal axis while the second immobilizing means is capable of limiting the movement of the motor in a second direction opposite to said first direction.

The fastening means takes the form of an excrescence which extends from the body along the longitudinal axis and which comprises a compartment for receiving a tooth originating from the collar.

Advantageously, the ring comprises an insert means adapting the dimensions of the receiving device to the dimensions of said motor.

According to a first embodiment, the insert means is a peripheral portion of the ring situated between the fastening means and the second immobilizing means.

According to a second embodiment, the insert means takes the form of at least one arm which emerges from the ring and which is capable of being inserted between said motor and said collar.

The invention also covers a motor-fan unit of a ventilation installation of a motor vehicle comprising an electric motor which actuates a propellor rotor and a device for receiving the electric motor capable of being fastened to said installation, said receiving device being produced according to one of the features explained above.

Advantageously, said motor support is connected to said collar by at least one decoupling means.

According to a variant, the decoupling means is a parallelepipedal block comprising a first side in direct contact with the collar, a second side in direct contact with the motor support and a third side which is free extending in the direction of the longitudinal axis of the motor, the third side having at least one recess extending in a direction parallel to the longitudinal axis. In this situation, the collar is connected to the rest of the motor support only by the decoupling means. There is therefore no other point of contact between the collar and the intermediate wall of the motor support than the decoupling means.

Finally, the receiving device takes the form of a generally cylindrical part that is open at each of its ends, one of its ends being closed by a distinct cover and fitted to said motor support.

A prime advantage according to the invention lies in the fact that it is no longer necessary to design and develop a motor support specifically matched to one size or to one type of electric motor. It is also possible to use motors from various different manufacturers without designing a new motor support.

Another advantage lies in the simplicity of logistical management within a factory for assembling ventilation, heating and/or air conditioning installations. Specifically, there is therefore only one part and toolage reference to be managed and the specifics of the electric motor are shifted to only one part of reduced size.

BRIEF DESCRIPTION OF THE DRAWINGS

Other features, details and advantages of the invention will emerge more clearly on reading the description given below as an indication with respect to drawings in which.

DETAILED DESCRIPTION

It should be noted that the figures explain the invention in detail; said figures may of course be used to better define the invention if necessary.

Figure 1:
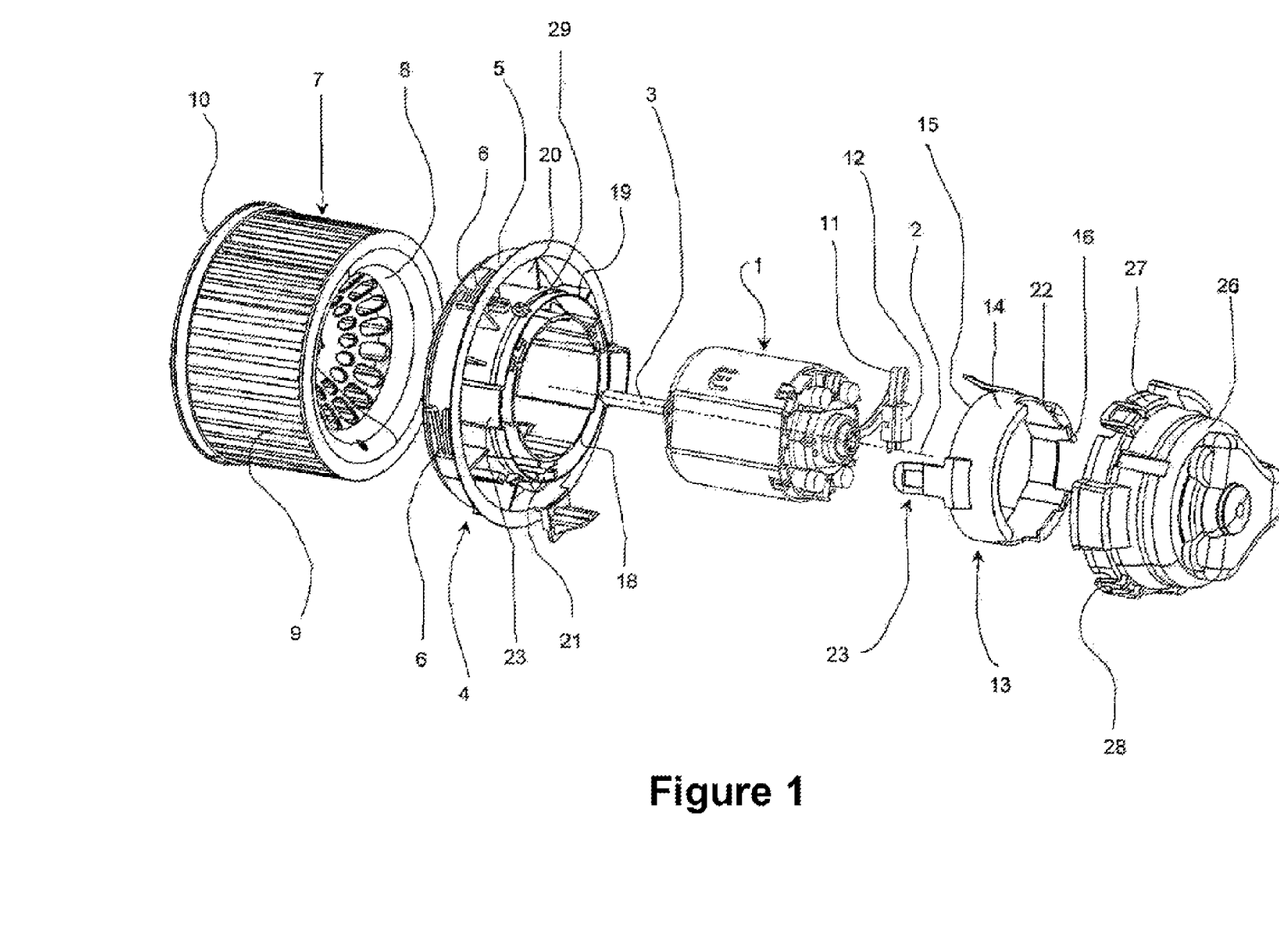
FIG. 1 is an exploded view of a motor-fan unit using an embodiment of the invention.

FIG. 1 shows the invention in an exemplary embodiment in which a device for receiving an electric motor 1 is used in a motor-fan unit of a ventilation, heating and/or air conditioning installation fitted to a motor vehicle. The motor 1 extends along a longitudinal axis 2 which passes through the center of the motor 1, this axis being the main axis of the motor in which a shaft 3 extends. This shaft 3 is supported by the motor at each of its ends, for example by bearings.

Visible to the left of the motor 1 is a motor support 4 made of plastic, for example of polypropylene, of circular shape which has a central recess for receiving the motor 1. This central recess is delimited by a collar 18.

An external peripheral wall 5 surrounds the collar 18 and comprises securing means 6 which are used to fasten the motor support 4 to a casing forming part of the ventilation, heating and/or air conditioning installation.

Between the external wall 5 and the collar 18 an intermediate wall 19 is installed that is connected to the external wall 5 by spacing means 20 and by a sidewall 32 (visible in FIG. 2), these spacing means taking the form for example of arms which extend radially relative to the axis 2 and are connected on one side to the external wall 5 and on the other side to the intermediate wall 19.

The intermediate wall 19 is moreover connected to the collar 18 by at least one decoupling means 21. The decoupling means 21 is made of a more flexible material than the materials used for the motor support 4 so as to perform an isolation function to prevent the transmission of the vibrations generated by the motor 1 between the collar 18 and the intermediate wall 19.

The external wall 5, the intermediate wall 19 and the collar 18 take the form of hollow cylindrical tubes installed generally concentrically relative to one another.

Figure 2:
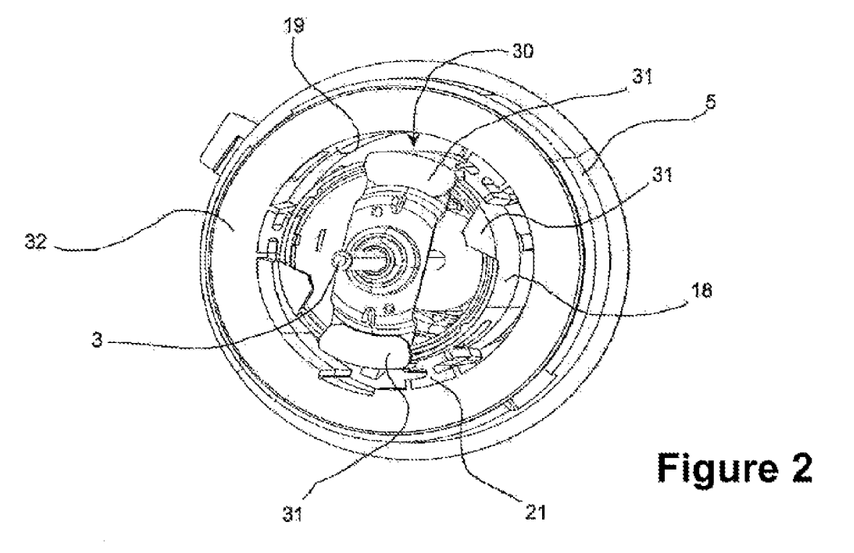
FIG. 2 is a side view in perspective of this motor-fan unit without the propellor rotor.

The collar 18 comprises at least one first immobilizing means which is visible in FIG. 2. In general, this first immobilizing means emerges from the collar 18 in the direction of the shaft 3 of the motor 1. The first immobilizing means participates in the maintenance and the securing of the motor 1 in the receiving device according to the invention.

The first immobilizing means is designed to limit the movement of the motor along the longitudinal axis. The electric motor therefore rests by one of its ends against the first immobilizing means.

In the extension of the motor support 4 and to the left of the motor support 4, a propellor rotor 7 is shown made of plastic which takes the form of a bowl 8, for example partially slotted, on the periphery of which a multiplicity of blades 9 extends. This multiplicity of blades 9 is connected on one side to the bowl 8 and on the other to a circular edge 10 which adjoins each of the blades 9. It will be noted that these blades 9 extend in a direction parallel to the direction of the longitudinal axis 2.

This propellor rotor 7 therefore takes the form of a radial propeller but it could also be a flat propeller in which the blades extend substantially perpendicularly relative to the direction of the longitudinal axis 2.

The propeller rotor 7 is secured to the shaft 3 via a hub placed in the center of the bowl 8, a hub through which the shaft 3 passes.

To the right of the motor 1 in FIG. 1, an electric loom 11 can be seen at the end of which a connector is installed which is used to electrically connect the motor to a device for controlling the motor-fan unit.

Further to the right of the motor 1 can be seen a ring 13 which participates in receiving and securing the motor 1 in the motor support 4. This ring 13 is made of plastic, for example of polypropylene, and takes a hollow circular form.

The ring 13 consists of a body 14, for example a circular body, having a first open end 15 turned toward the collar 18 and a second open end 16 opposite to the first end 15 relative to the body 14.

The ring 13 and the collar 18 are two distinct and separate parts, that is to say they are manufactured independently of one another and assembled to one another with the aid of the fastening means 23.

At least one second immobilizing means 22 is formed on the body 14 of the ring 13 at the second end 16. This second immobilizing means extends angularly, in other words radially relative to the axis 2 toward the shaft 3 of the motor 1 and thus forms an abutment which limits or immobilizes the movement of the motor 1, the motor 1 resting against the second immobilizing means 22 by the resting of its end against the abutment forming the second immobilizing means 22.

As an exemplary embodiment, the second immobilizing means 22 forms a continuous circular band on the body 14. Alternatively, and as shown in FIG. 1, the second immobilizing means 22 is formed discontinuously. In other words, the second immobilizing means 22 is formed of at least one radial tongue originating from the body 14 in line with the second end 16, the second end not having this tongue over at least one angular sector.

The first immobilizing means faces the second immobilizing means 22, so the electric motor 1 is inserted between these two immobilizing means. The first immobilizing means holds the electric motor 1 in a first direction along the longitudinal axis 2 while the second immobilizing means 22 prevents the displacement or the movement of the motor in one and the same direction, that is to say along the longitudinal axis 2, but in a direction opposite to the holding direction of the motor 1 carried out by the first immobilizing means.

The receiving device according to the invention comprises at least one fastening means 23 the object of which is to connect the ring 13 to the collar 18. In other words, this fastening means 23 has the function of mechanically securing these two parts so as to define a volume which encloses the motor 1.

Preferably, the fastening means 23 is removable in that the mechanical connection between the collar 18 and the ring 13 can be dismantled without destroying one or the other of these parts.

At the right end of FIG. 1, a cover 26 is shown which takes the form of a hollow dish and the function of which is to close the rear portion of the motor-fan unit. This cover 26 is distinct, that is to say separate from the collar and from the ring, and is fitted to said motor support after assembly and securing of the ring 13 to the collar 18.

This cover 26 comprises a peripheral wall 27 which borders an open end of this cover from which emerges at least one fastening clip 28 which takes the form of a U-shaped tie attached at each end of the branches of the "U" to the peripheral wall 27.

These fastening clips 28 interact with lugs 29 originating from the molding with the motor support 4. More precisely, these lugs 29 are formed on the intermediate wall 19 of the motor support 4. As an example, these lugs are formed on the face 29 of the intermediate wall 19 which is turned toward the external wall 5 of the motor support 4.

FIG. 2 shows more particularly the first immobilizing means 30. The first immobilizing means 30 is formed on the collar 18 of the motor support 4 at a first end of the collar 18, this end being that which is closest to the propellor rotor. This first immobilizing means 30 extends radially relative to the axis 2 toward the shaft 3 of the motor 1 and thus forms an abutment which limits or immobilizes the movement of the motor 1. It can be therefore understood that the first immobilizing means 30 straddles the end of the motor 1 on the side of the propellor rotor.

As an exemplary embodiment, the first immobilizing means 30 forms a continuous circular band level with the first end of the collar 18. As an alternative and as shown in FIG. 2, the first immobilizing means 30 is formed discontinuously. In other words, the first immobilizing means 30 is formed of at least one radial tongue 31 molded together with the collar 18, the first end of the collar 18 having no tongue over at least one angular sector. In this exemplary embodiment, the tongues are four in number.

FIG. 2 also shows a sidewall 32 which extends in a plane orthogonal to the longitudinal axis 2 and which joins the external wall 5 to the intermediate wall 19. On the border of this sidewall 32 and between the intermediate wall 19 and the collar 18, it is possible to see an exemplary embodiment of the decoupling means 21 which in this instance takes the form of three retaining blocks distributed over the circumference of the collar 18. The material of the decoupling means 21 is natural rubber, polypropylene, EPDM or SEBS.

Figure 3:
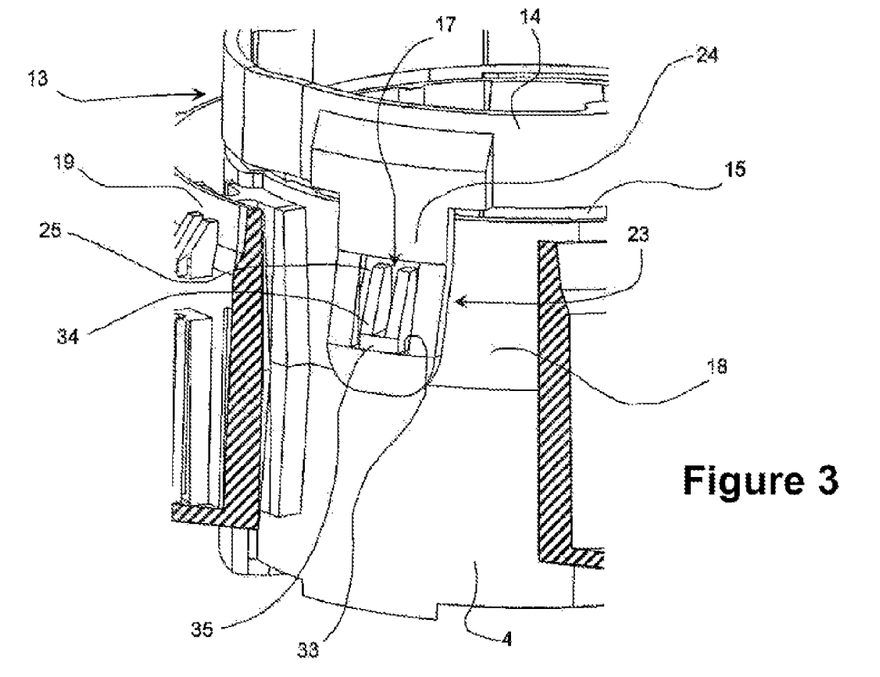
FIG. 3 is a partial view of one embodiment of the invention.

FIG. 3 shows in detail the fastening means 23. For reasons of representation, the intermediate wall 19 is shown cut away (hash markings) so as to make the fastening means 23 clearly apparent.

The fastening means 23 comprises an excrescence 24 which extends from the body 14 in a direction parallel to the longitudinal axis 2 and passes beyond the first end 15 in the direction of the collar 18. As an example, there are at least three arms which emerge at the periphery of the body 14.

The fastening means 23 also comprises a tooth 17 formed on the collar 18. As an example, the tooth 17 emerges from a face forming part of the collar 18 turned toward the intermediate wall 19.

The tooth 17 extends radially relative to the axis of the collar 18 and toward the outside of the collar 18. This tooth takes the form of a tooth for retaining the excrescence 24 made on the ring 13. This tooth 17 has a ramp 34 that is inclined and terminated by a leading edge 35 placed perpendicularly to the longitudinal axis 2.

This excrescence 24 comprises a compartment 25 for receiving the tooth 17 originating from the collar 18. This compartment 25 takes the form of a through-hole made at a free end of the excrescence 24 but it may also be a non-emerging housing inside which the tooth 17 is hooked.

The securing of the ring 13 to the collar 18 occurs when one edge 33 of the receiving compartment 25 rests against the leading edge 35. It will be noted that the excrescence 24 has a thickness that is defined so as to make it flexible and thus to deform when the ring 13 is in the phase of assembly on the collar 18. This fastening means 23 participates in the retention and the securing of the electric motor 1 in cooperation with the first immobilizing means 30 formed on the collar 18 and the second immobilizing means 22 formed on the ring 13.

Figure 4:
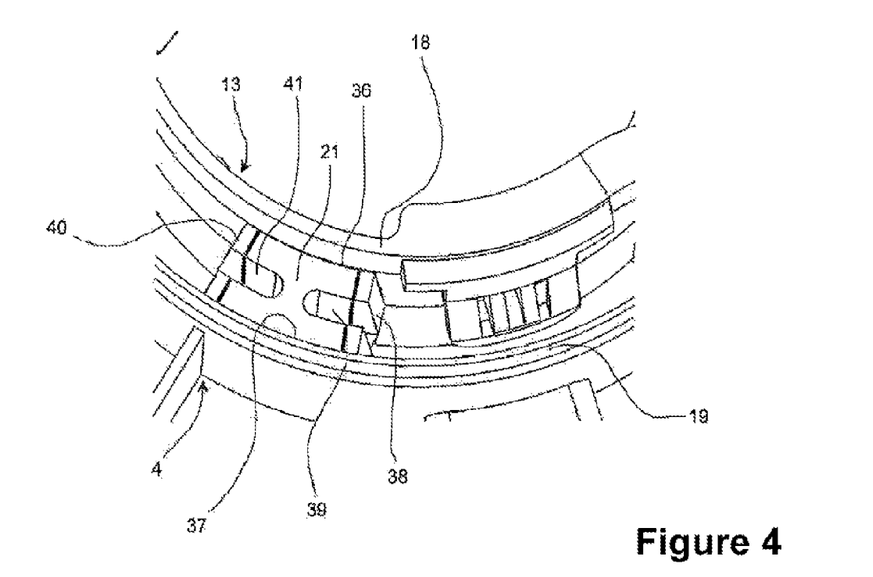
FIG. 4 is a view in perspective of the fitted motor-fan group of the invention.

The decoupling means 21 of the invention is shown as an example in FIG. 4. This decoupling means is a parallelepipedal block comprising a first side 36 in direct contact with the collar 18 of the motor support 4.

The decoupling means comprises a second side 37 in direct contact with the intermediate wall 19 of the motor support 4 and a third side 38 which is free extending parallel to the longitudinal axis 2 of the motor 1. The third side 38 has at least one recess 39 extending in a direction parallel to the longitudinal axis 2.

The decoupling means 21 comprises a fourth side 40 also having at least one recess 41. The specific structure of the decoupling means ensures the decoupling between the motor 1 and the motor support 4 irrespective of the type of vibrations caused by the use of the motor and of the propeller rotor. Thus, the vibrations of the axial type and of the tangential type are absorbed by the decoupling means 21. The recess 40 and/or 41 created in a direction parallel to the longitudinal axis 2 confers a flexibility on the block relative to an axial stress and to a tangential stress while retaining a rigidity of the block relative to a radial stress.

Advantageously, the decoupling means 21 is H-shaped.

The collar 18, the decoupling means 21, the intermediate wall 19 and the external wall 5 form a single part, manufactured all in one piece by using an overmolding method to form the decoupling means 21.

Alternatively, the decoupling means 21 is overmolded onto the collar 18 is mechanically fitted to the intermediate wall 19, for example by an interaction of the decoupling means with a receiving housing made on the intermediate wall 19. In such a situation, the collar 18 and the decoupling means are manufactured in one and the same molding-overmolding operation and the motor support 4 (intermediate wall 19 and external wall 5) forms only one part.

As a further alternative, the decoupling means 21 is overmolded onto the intermediate wall 19 in order to mechanically fit onto the collar 18. Thus, the motor support 4 and the decoupling means 21 are manufactured in a single piece using an overmolding method and the collar 18 is fitted by interaction between the decoupling means and housings for receiving this decoupling means that are manufactured on the collar 18.

Figure 5:
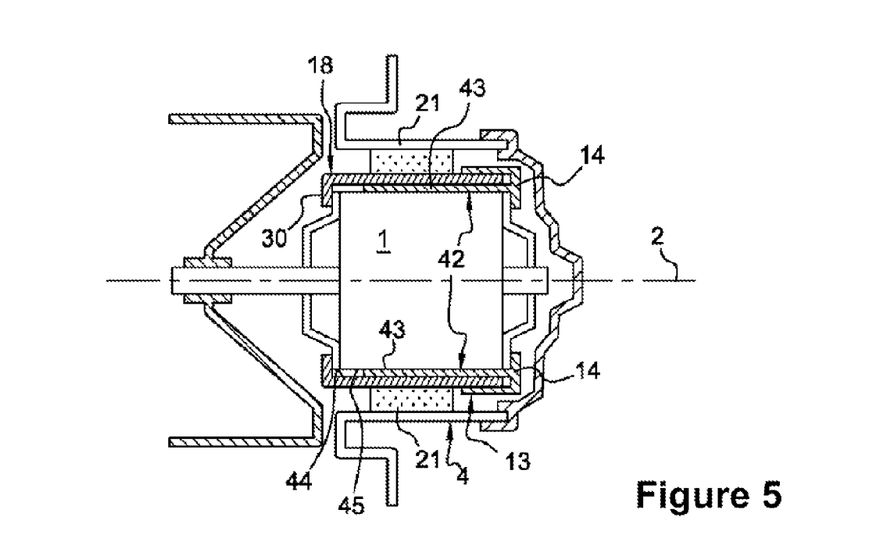
FIG. 5 is a schematic view of a first variant of the motor-fan unit according to the invention.
Figure 6:
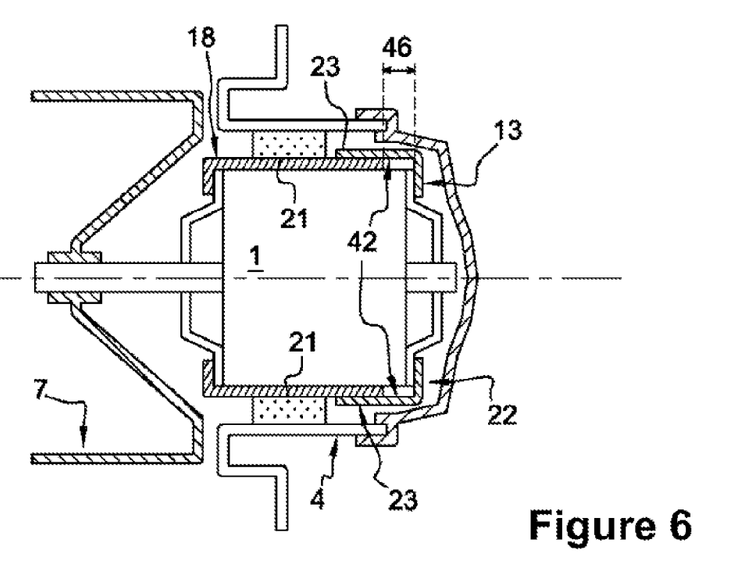
FIG. 6 is a schematic view of a second variant of the motor-fan unit according to the invention.
Figure 7:
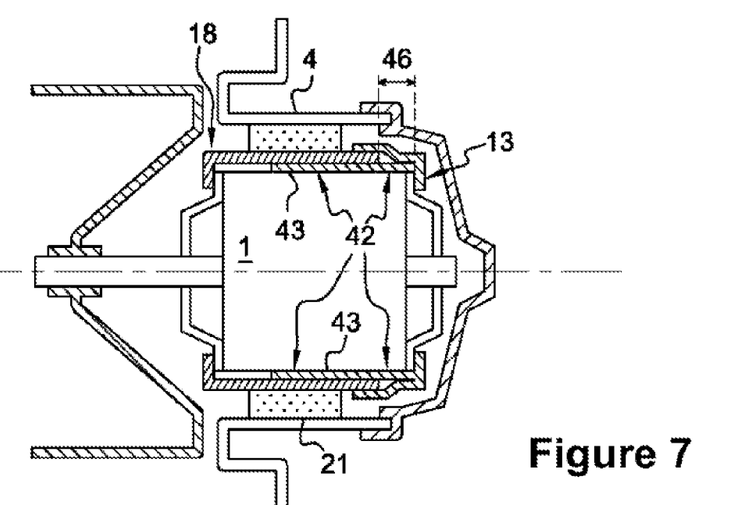
FIG. 7 is a schematic view of a variant combining the embodiment of FIGS. 5 and 6.

Exemplary embodiments of an insert means 42 according to the invention are shown in FIGS. 5 to 7.

In general, the function of the insert means is to adapt the receiving device to a different type or size of electric motor 1. In other words, the insert means adapts the dimensions of the receiving device, in particular the dimensions of the zone for receiving the motor, to the dimensions of this electric motor 1. This receiving zone is delimited by the first immobilizing means 30, the collar 18, the body 14 of the ring 13 and the second immobilizing means 22.

In the case of FIG. 5, it involves a portion forming part of the ring 13 inserted between the electric motor 1 and the collar 18 so as to keep and secure a motor of lesser diameter than the internal diameter of the collar 18 while the length of this motor is substantially equivalent to the length of the collar 18. In other words, the insert means is used in a situation in which the motor is not in contact with the collar when these parts are installed coaxially.

As an example, the insert means 42 takes the form of at least one arm 43 which originates on the body 14 of the ring 13. Alternatively, the arm 43 comes out of the second immobilizing means 22 and originates on the abutment formed by the second immobilizing means 22.

The arm 43 extends parallel to the longitudinal axis 2 of the motor 1 and is interposed between an interior face 44 of the collar 18 and a body of the motor delimited by a peripheral wall 45. The arm 43 is then in contact on one side with the internal face 44 and on the other with the peripheral wall 45.

In one exemplary embodiment of the invention, the arms 43 are three in number. They thus form a discontinuous collar around the motor. Alternatively, the insert means takes the form of a circular tube formed all around the motor 1.

FIG. 6 illustrates the insert means 42 in a variant devoted to the adaptation of the receiving device to an electric motor 1 of which the external diameter corresponds to the internal diameter of the collar 18 but of which the length is greater than the length of this collar. In this instance, the insert means takes the form of a peripheral portion 46 adjacent to the body 14 of the ring 13. In practice, this peripheral portion corresponds to a lengthening of the body 14 situated between the fastening means 23 and the second immobilizing means 22. This peripheral portion 46 thus covers the portion of the motor 1 that projects longitudinally beyond the collar 18 allowing the second immobilizing means 22 to come to rest on the motor 1 while ensuring that the excrescence 24 is engaged on the tooth 17.

FIG. 7 illustrates a combination of the insert means of FIG. 5 with the insert means of FIG. 6. This involves ensuring the fastening of a motor 1 which has both an external diameter that is smaller than the internal diameter of the collar 18 and a length that is greater than the length of this same collar 18.

The ring 13 comprises the peripheral portion 46 and at least one arm 43 with a length adapted to be inserted between the motor 1 and the collar 18.

Figure 8:
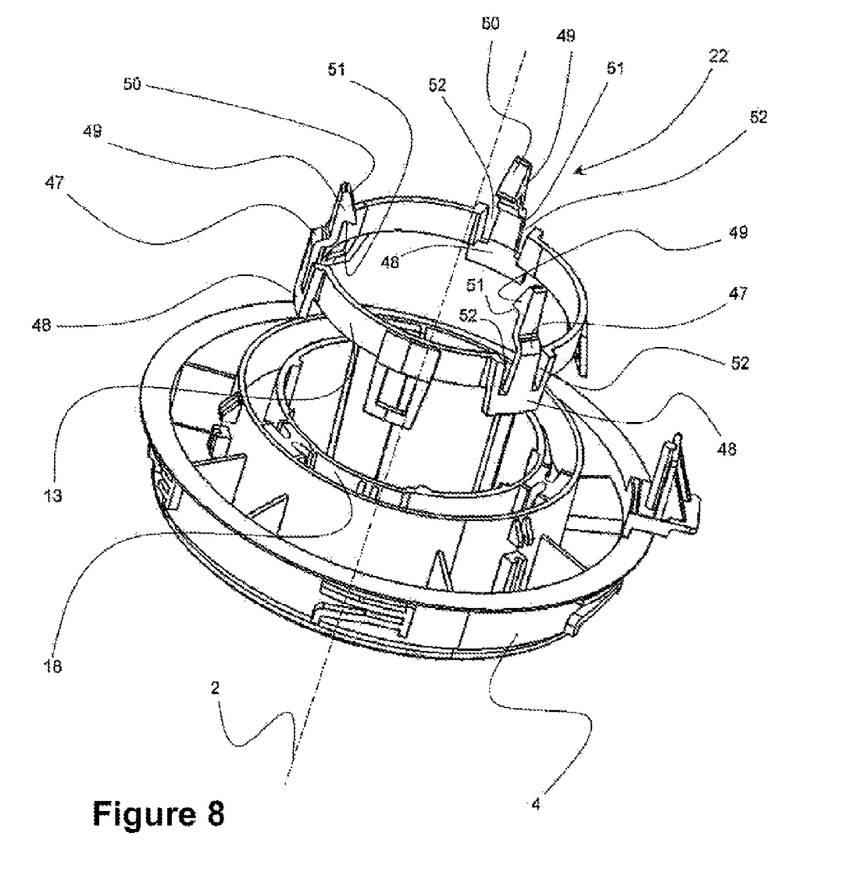
FIG. 8 is a view in perspective of a variant of the invention.

FIG. 8 illustrates an embodiment of the invention that differs from the previous variants in that the second immobilizing means 22 of the ring 13 is flexible. In this figure, the ring 13 is shown before it is mounted onto the collar 18.

The second immobilizing means 22 of the motor comprises three fingers 47 distributed over the periphery of the ring 13 along an angular sector for example equal to 120°. Each of these fingers 47 originates on the ring 13 at a reinforcement 48 which extends radially relative to the longitudinal axis 2. This reinforcement 48 protrudes from the ring 13 toward the outside of the ring 13 and extends in the longitudinal axis 2 in the direction of the motor support 4. The offset of this reinforcement 48 relative to the ring 13 prevents interference between the reinforcement 48 and the collar 18 when the ring 13 is assembled on the collar 18.

The finger 47 has an end opposite to the reinforcement 48, this free end terminating in a hook 49. The hook 49 comprises an inclined face 50 which extends from the free end of the finger 47 to a preemptive edge 51 which extends in a plane perpendicular to the longitudinal axis 2.

The face 50 of each finger 47 is inclined such that the diameter of a circle that is drawn on the free ends of the fingers 47 is greater than the diameter of a circle that is drawn on the rim formed at the junction of the inclined face 50 and the preemptive edge 51 of each finger 47.

This finger 47 is made flexible relative to the ring 13 by means of slots 52 made in the reinforcement 48 on either side of the finger 47 over the height corresponding to the height of the ring. These slots 52 extend in the direction of the longitudinal axis 2.

The flexibility of the finger 47 combined with the inclined face 50 of the fingers 47 makes it possible to insert the electric motor after having assembled the ring 13 on the collar 8.

Figure 9:
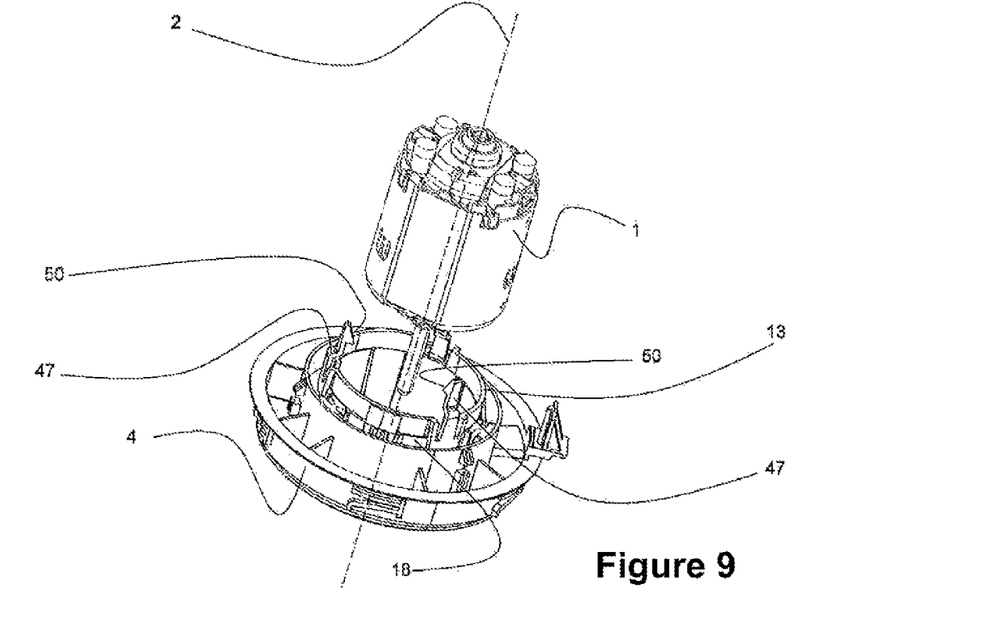
FIG. 9 is a view in perspective of the assembly of the motor in the variant of FIG. 8.
Figure 10:
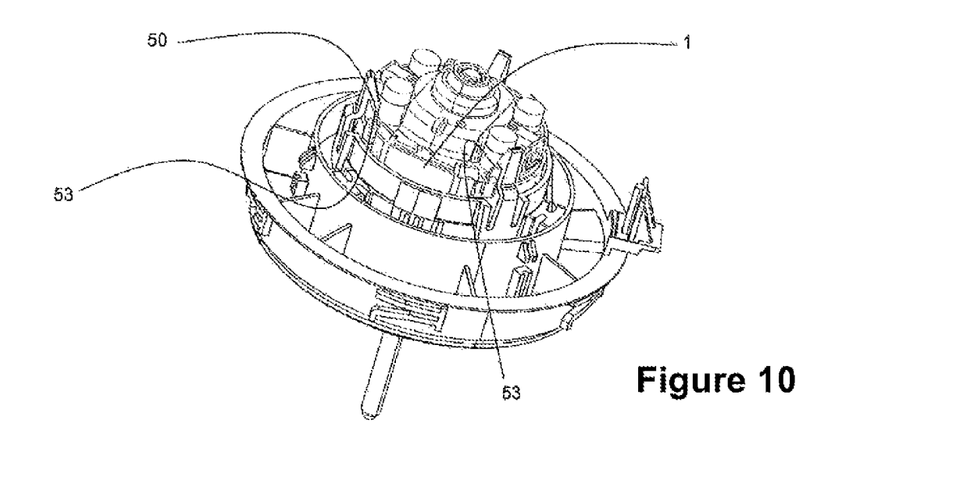
FIG. 10 is a view in perspective of the motor assembled in the variant of FIG. 8.

This is better illustrated in FIGS. 9 and 10. FIG. 9 shows the ring 13 assembled to the collar 18 of the motor support 4. The motor 1 is illustrated ready to be inserted into the motor support 4. This operation is carried out by translation of the motor 1 in the direction of the longitudinal axis 2 going toward the motor support 4. When the motor 1 comes into contact with the inclined face 50 of the fingers 47, a radial force relative to the longitudinal axis 2 is applied to the fingers 47 which tends to push them aside.

FIG. 10 shows the electric motor 1 once inserted into the motor support 4, in the final position. When the motor butts against the first immobilizing means formed on the collar 8, the flexibility and the resilience of the fingers 47 allows the fingers 47 to resume their position such that the preemptive edge 51 engages on a rim 53 forming part of the electric motor 1. More specifically, this rim is an edge of the metal carcass that surrounds the motor 1.

Figure 11:
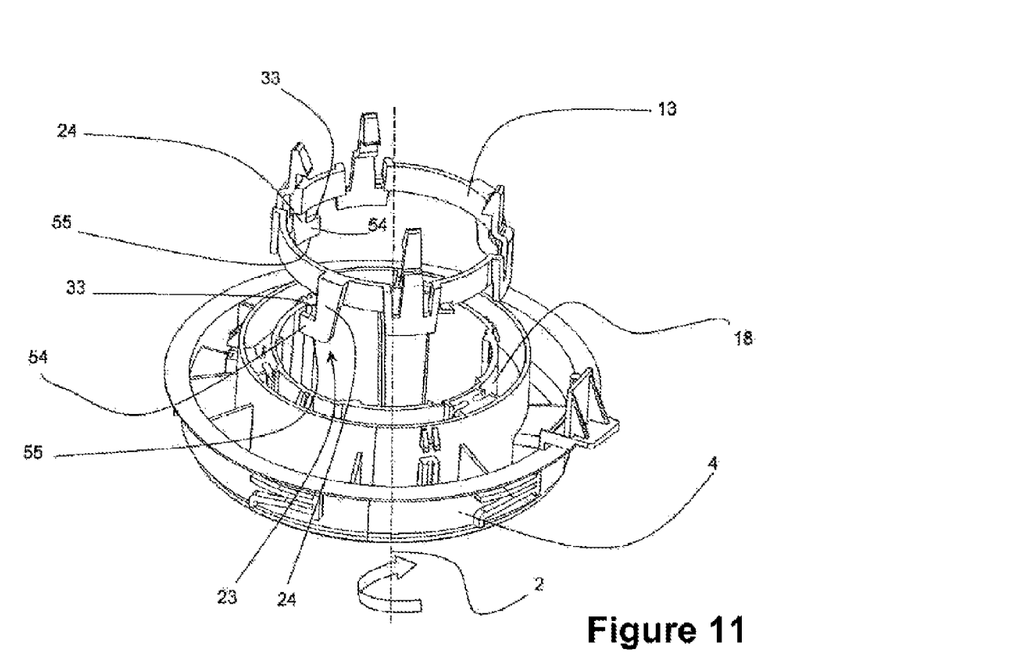
FIG. 11 is a view in perspective of an embodiment according to the invention.

FIG. 11 shows a variant embodiment of the fastening means 23 that connects the ring 13 to the collar 18. This fastening means is generally L-shaped. The excrescence 24 extends in a direction parallel to the longitudinal axis 2 toward the motor support 4. The free end of this excrescence 24 terminates in a flat 54 which extends at right angles to the longitudinal axis 2 and over a restricted angular sector (from 2° to 10°) about this axis. Each flat 54 has a first edge 33 intended to rest against a tooth 17 but it also comprises a second edge 55 which is opposite to the first edge 33 relative to the flat 54.

Figure 12:
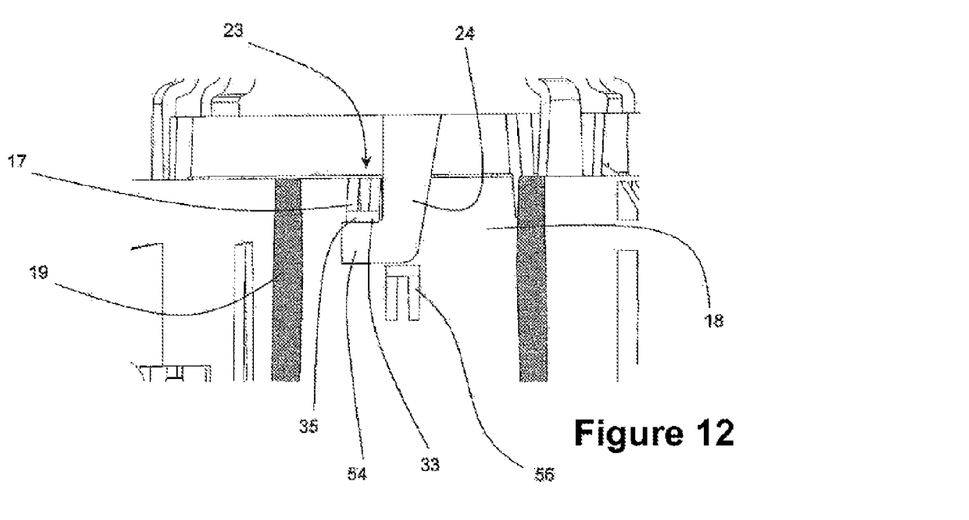
FIG. 12 is a detailed view of the embodiment of FIG. 11, FIGS. 13 to 15 are views illustrating a means for immobilizing the ring on the collar.

FIG. 12 shows in detail the fastening means 23 in detail. The first edge 33 rests on the leading edge 35 of the tooth 17 formed at the external periphery of the collar 8.

A guidance point 56 is formed on the external periphery of the collar 18. This guidance point 56 originates from molding with the collar 18. This guidance point 56 is offset angularly relative to the tooth 17 and spaced from the tooth 17 at a distance equivalent to the height of the flat 54. The flat 54 is thus inserted or interposed between the tooth 17 and the guidance point 56.

The function of this guidance point 56 is to stop the translation of the ring 13 in the longitudinal direction along the axis 2 so as to ensure that the preemptive edges 51 rest on the rim 53 of the motor 1 and thus ensure that the motor 1 is immobilized.

Figure 13:
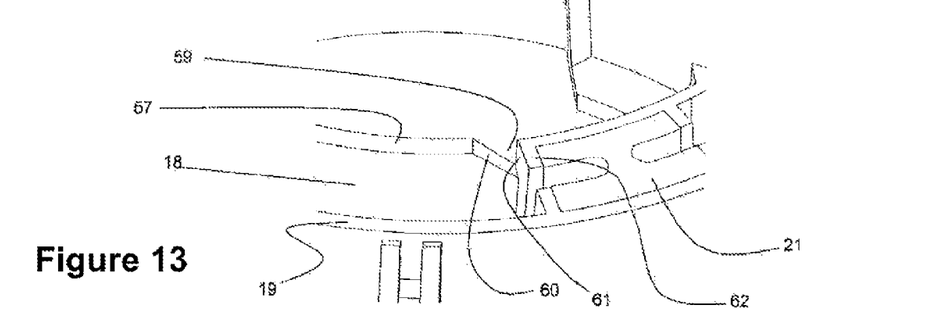
Figure 14:
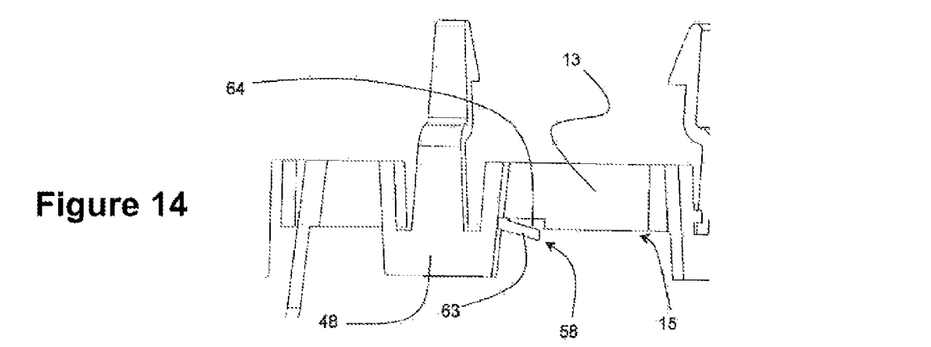
Figure 15:
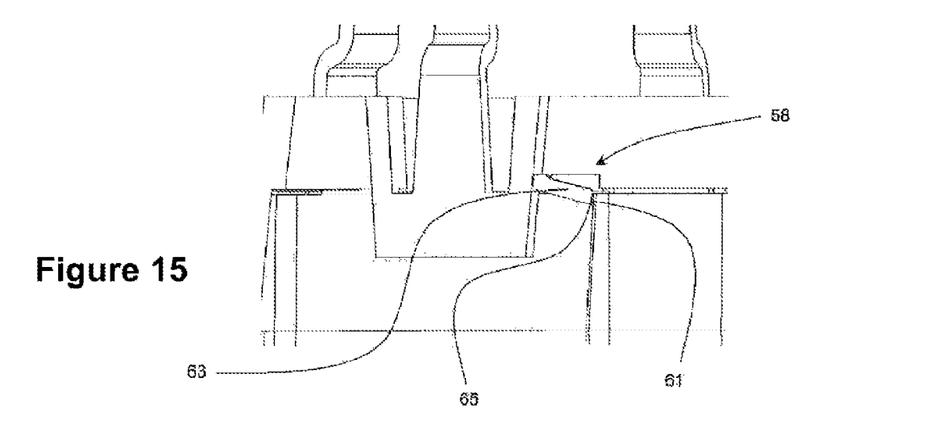

FIGS. 13 to 15 show an exemplary embodiment of a device 58 for stopping the ring 13 from rotating on the collar 18 when the collar 18 are assembled according to the fastening mode illustrated in FIGS. 11 and 12. The function of this device is to stop the ring 13 from rotating in one direction about the longitudinal axis 2 relative to the collar 18.

FIG. 13 shows a partial view of the collar 18, of the decoupling means 21 and of the intermediate wall 19. A first portion of the rotary immobilizing device 58 is also illustrated. The collar 18 has an edge 57 on which a notch 59 is made. The notch 59 forms part of the device 58 for stopping rotation.

The notch 59 is delimited by an inclined face 60 and an abutment 61, the abutment 61 being formed by the collar 18 and more particularly by a housing 62 which forms part of the collar 18 and which receives the decoupling means 21.

FIG. 14 illustrates a second portion of the device 58 for stopping rotation. The ring 13 comprises a flexible tongue 63 formed at the first open end 15 turned toward the collar 18. This tongue 63 originates at the reinforcement 48 and extends in an inclined plane relative to the general plane of the ring 13. The ring 13 also comprises a cut-out 64 of a shape that matches the shape of the flexible tongue 63 so as to receive the flexible tongue 63 in the phase of assembling the ring 13 on the collar 18.

FIG. 15 illustrates the interaction of the flexible tongue 63 of the ring 13 with the notch 59 made on the edge of the collar 18. One end 65 formed by the free end of the tongue 63 rests on the abutment 61 of the notch 59. This ensures that rotation in the counterclockwise direction is prevented by the device 58 for stopping rotation. The rotation in the clockwise direction is for its part prevented by the side of the excrescence 24 resting on a side of the tooth 17 (FIG. 12).

The method for assembling the motor 1 in the motor support 4 relative to the variant of FIGS. 11 to 15 will now be described.

The ring 13 is first of all brought close to the collar 18 by translation of the collar 18 in a direction parallel to the longitudinal axis 2. When the flat 54 rests on the guidance point 56, a rotation of the ring 13 in the clockwise direction about the longitudinal axis 2 is carried out. The effect of this rotation is to bring the flat 54 to be engaged against the tooth 17 of the fastening means 23. During this translation phase, the device 58 for stopping rotation is used. Specifically, the flexible tongue 63 deforms in a direction parallel to the longitudinal axis 2 and is housed in the cut-out 64 under the force applied by the ring 13 against the collar 8. When the excrescence 24 butts against the tooth 17, the flexible tongue 63 resumes its initial and inclined shape so as to position itself in the notch 59. The end 65 then rests against the abutment 61 and thus prevents the ring 13 from rotating relative to the collar 8.

At this stage of the assembly, the motor 1 is inserted into the ring 13 and then into the collar 8 by a translation along the longitudinal axis 2.

The variant of FIGS. 8 to 10 illustrating the immobilizing means 22 in a flexible form is naturally applicable to the fastening means 23 illustrated in FIGS. 1 to 7 and to the fastening means illustrated in FIGS. 11 to 15.

Similarly, the insert means 42 illustrated in FIGS. 5 to 7 is applicable to the variant of the invention illustrated in FIGS. 11 to 15.

The receiving device according to the invention, by separating the motor-retaining collar into two, thus makes it possible to standardize the motor support 4 and the collar 18 fitted with its decoupling means 21 and to shift the specifics relative to the motor onto the ring 13.

The invention claimed is:

1. A device for receiving an electric motor which extends along a longitudinal axis and which is capable of being housed inside a motor support of a ventilation installation for a vehicle, said receiving device is connected to said motor support by a decoupling means and comprises a collar on which is formed a first immobilizing means, a ring comprising a second immobilizing means, wherein the collar and the ring are distinct and connected to one another by at least one fastening means.

2. The device as claimed in claim 1, wherein the first immobilizing means is capable of limiting the movement of the motor along the longitudinal axis.

3. The device as claimed in claim 2, wherein the collar is capable of surrounding the motor and from which emerges the first immobilizing means, the first immobilizing means taking the form of an abutment which extends radially relative to the longitudinal axis.

4. The device as claimed in claim 2, wherein the ring comprises a body capable of surrounding the motor and from which emerges the second immobilizing means, the second immobilizing means taking the form of an abutment which extends at an angle relative to said body.

5. The device as claimed in claim 4, wherein the fastening means takes the form of an excrescence which extends from the body along the longitudinal axis and which comprises a compartment for receiving a tooth originating from the collar.

6. The device as claimed in claim 4, wherein the fastening means takes the form of an excrescence which extends from the body along the longitudinal axis, said excrescence terminating in a flat which rests against a tooth originating from the collar.

7. The device as claimed in claim 6, wherein the flat is interposed between the tooth and a guidance point originating from the collar.

8. The device as claimed in claim 6, wherein a rotary immobilizing device is provided to prevent the rotation of the ring relative to the collar.

9. The device as claimed in claim 8, wherein the rotary immobilizing device is formed by a flexible tongue originating from the ring which interacts with a notch made in the collar.

10. The device as claimed in claim 1, wherein the second immobilizing means is capable of limiting the movement of the motor along the longitudinal axis.

11. The device as claimed in claim 10, wherein the second immobilizing means takes the form of at least one flexible finger.

12. The device as claimed in claim 1, wherein the first immobilizing means is capable of retaining said motor in a first direction along the longitudinal axis while the second immobilizing means is capable of limiting the movement of the motor in a second direction opposite to said first direction.

13. The device as claimed in claim 1, wherein the ring comprises an insert means adapting dimensions of the receiving device to the dimensions of said motor.

14. The device as claimed in claim 13, wherein the insert means is a peripheral portion of the ring situated between the fastening means and the second immobilizing means.

15. The device as claimed in claim 13, wherein the insert means takes the form of at least one arm which emerges from the ring and which is capable of being inserted between said motor and said collar.

16. A motor-fan unit of a ventilation installation of a motor vehicle comprising an electric motor which actuates a propellor rotor and a support of the electric motor capable of being fastened to said installation, wherein the motor-fan unit comprises a receiving device as claimed in claim 1.

17. The motor-fan unit as claimed in claim 16, wherein said collar is connected to said motor support by at least one decoupling means.

18. The motor-fan unit as claimed in claim 17, wherein the decoupling means is a parallelepipedal block comprising a first side in direct contact with the intermediate wall, a second side in direct contact with the collar and a third side which is free extending in the direction of the longitudinal axis of the motor, the third side having at least one recess extending in a direction parallel to the longitudinal axis.

19. A method for mounting a motor-fan unit comprising an electric motor with a longitudinal axis and a motor support in which a receiving device is housed which comprises a collar on which is formed a first immobilizing means, a ring comprising a second immobilizing means, the collar and the ring being distinct and connected to one another by at least one fastening means, comprising:

fastening the ring to the collar with the aid of the fastening means; and inserting the electric motor into the ring previously mounted on the collar by deforming the second immobilizing means.

20. The mounting method as claimed in claim 19, wherein the step of fastening the ring on the collar is carried out in a translation parallel to the longitudinal axis.

21. The mounting method as claimed in claim 20, wherein a step of rotating the ring relative to the collar is carried out after the translation step.

* * * * *